E. O. SCHWEITZER.
TRANSFORMER REGULATION.
APPLICATION FILED DEC. 7, 1910.
1,154,441. Patented Sept. 21, 1915.
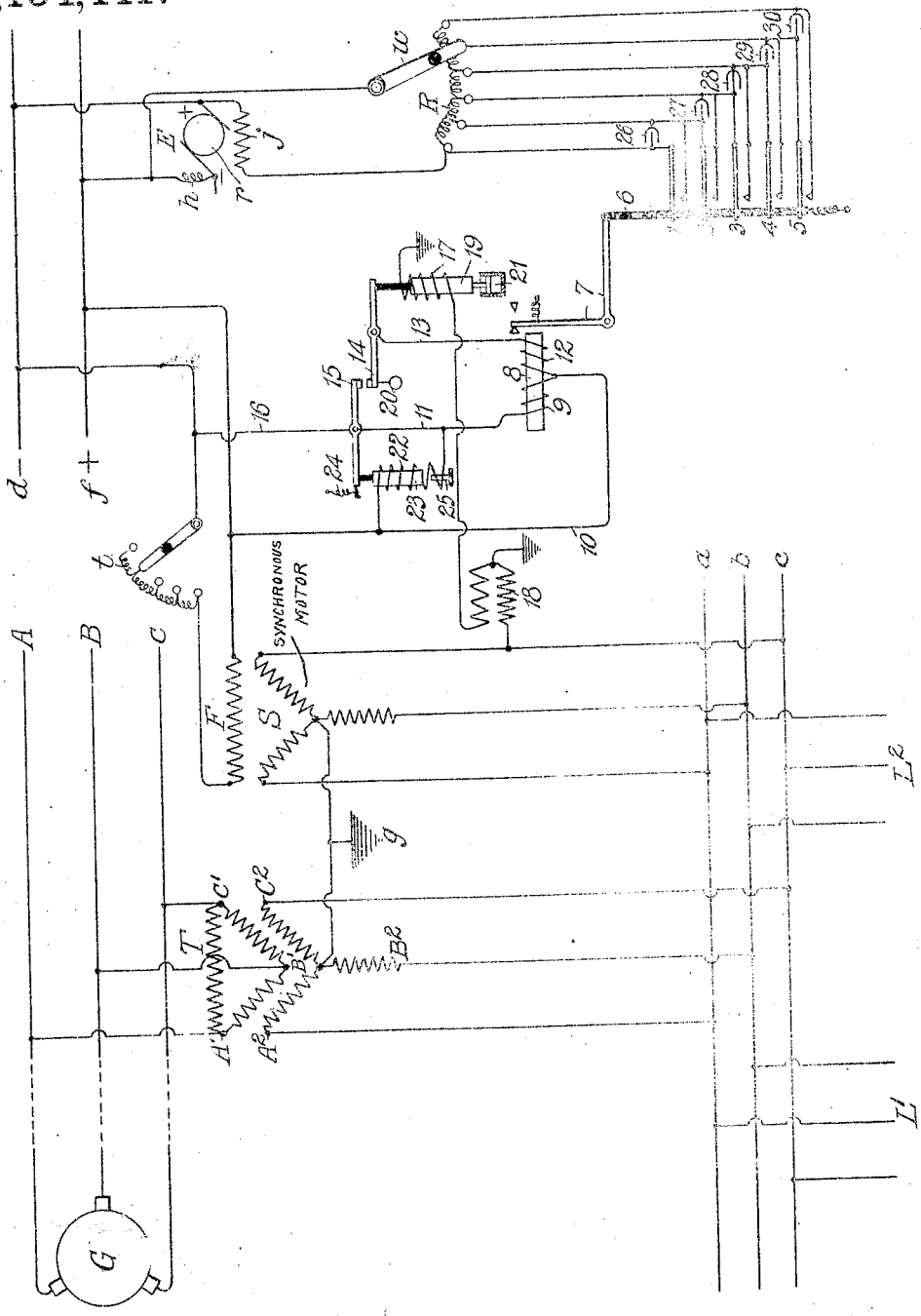
Witnesses
Inventor
Edmund O. Schweitzer
By Attorneys

UNITED STATES PATENT OFFICE.

EDMUND O. SCHWEITZER, OF CHICAGO, ILLINOIS.

TRANSFORMER REGULATION.

1,154,441.  Specification of Letters Patent.  Patented Sept. 21, 1915.

Application filed December 7, 1910. Serial No. 596,058.

*To all whom it may concern:*

Be it known that I, EDMUND O. SCHWEITZER, a citizen of the United States, residing at Chicago, in the county of Cook and State of Illinois, have invented certain new and useful Improvements in Transformer Regulation, of which the following is a full, clear, concise, and exact description, reference being had to the accompanying drawings, forming a part of this specification.

My invention relates to alternating current transformers of electricity.

For various reasons well known to the art it is desirable that the pressure on electric power and lighting circuits be maintained as nearly constant as is feasible. My invention provides a combination which contributes toward this ultimate result, while at the same time permitting the use of an alternating current transformer which will withstand the electrical shocks due to short circuits or other accidents to the circuits supplied.

Transformers have a certain natural regulation, but cannot have in and of themselves any means of regulation to take care of fluctuations in the line voltage. While a transformer may be made to have a very high regulation upon loads of unity power factor, I have found it desirable in large installations to forego such high regulation in order that the transformer may be constructed to withstand shocks such as are caused by short circuits. When, however, the transformer is constructed in such a way as to prevent damage to the windings on account of such short circuits it is necessary to give the transformer a large impedance drop. When the impedance drop of the transformer is thus increased to, say, five per cent. (5%), with full load current, the regulation will be very much impaired. While such a transformer may have about two per cent. (2%) regulation at full load with unity power factor, it is generally necessary to provide against the effect which will be had when large induction motors are started and against the effect of a poor power factor on ordinary commercial loads. Where a fair percentage of the current is consumed in power motors, the regulation of a transformer having this large impedance drop is certain to fall below the limits of good commercial practice. When to the drop of a transformer having this poor regulation is added the resistance drop of a long line, the regulation of the system may become intolerable even if the pressure at the generating station is regulated better than two per cent. (2%).

In accordance with my invention, I provide, in the first place, a transformer which is designed to have a large leakage of magnetic lines of force which do not link both primary and secondary windings; the primary and secondary windings are in other words not closely interlaced. This leakage is made sufficient to produce an impedance drop of, say, five per cent. (5%) on full load current. Such a transformer is likely to withstand the shocks incident to short circuits without damage to the windings. One or more transformers of this construction may be connected to buses with which the distributing or load circuits are connected. Across the bus bars I connect a synchronous motor, wound and connected for the same number of phases as are the previously mentioned transformers. If the direct current field of the synchronous motor be sufficiently strengthened the motor will pick up a leading current, thus reducing the lag of the transformer current and improving the power factor of the transformer load. The size of the synchronous motor relative to the capacity of the transformers will depend somewhat upon the probable power factor of the load, and, although I have found it unprofitable to attempt to bring the power factor to unity, it is possible to do so by installing a synchronous motor of sufficient capacity; in fact, the whole load upon the transformer can be made by this means to have a leading power factor. Since the regulation of the transformer or transformers is far better at or near unity power factor than on loads of low power factor, a synchronous motor with constant field excitation of proper value will result in a large improvement in the regulation of transformers supplying commercial loads in which a considerable percentage of the total energy is supplied for power purposes. With constant field excitation the current taken up by the synchronous motor will remain constant, the transformer being forced to take up the fluctuations or variations in the load. The line current will, of course, be reduced to an extent dependent upon the correction of the power factor as effected by the synchronous motor, and this, also will result in an improved regulation of transformer and line. To complete the combination of my invention I go further and provide an automatic mechanism to control the excitation of the synchronous motor. The excitation is controlled in such a way that any variations in the demand upon the transformer are compensated for by corresponding variations in the power factor effected through the agency of the synchronous motor. Not only does the automatic mechanism control the excitation of the synchronous motor to take care of variations in the load or demand upon the transformer, but also to take care of any fluctuations in the pressure of the current supplied from the generating station. This automatic regulating mechanism is arranged to act through the agency of the exciter for the synchronous motor. The exciter is a shunt or compound wound dynamo of direct current. In series with its shunt field winding is connected a resistance, which, preferably, is made variable as is a rheostat. I provide a series of switch contacts, which, when closed, short circuit the resistance in series with the exciter field winding, these short-circuiting contacts being intended to regulate or control the voltage of the current delivered from the exciter to the field winding of the synchronous motor. Ordinarily, these short-circuiting contacts are neither open nor closed for any very long period of time. Generally they are in rapid vibration, with the result that the resistance in series with the shunt field winding of the exciter is rapidly cut in and out of circuit. When the resistance is in circuit with the shunt field winding the field current of the exciter is reduced, with a consequent drop in the potential of the direct current delivered to the field of the synchronous motor. When the resistance in series with the exciter field winding is momentarily short-circuited the current through the exciter field winding will increase, with a resulting increase in the field excitation of the synchronous motor. The magnetic inertia of the field of the exciter is such that the sudden and momentary making and breaking of the short-circuit in shunt of the field resistance results in a comparatively gradual variation in the magnetism of the exciter field, this graduation of the otherwise sudden changes in field magnet strength being aided by a series of condensers in shunt of the switch contacts, which serve to short-circuit the several sections of the field resistance. The vibration of the short-circuiting contacts above referred to is controlled by a combination of electromagnetic mechanism, influenced, primarily, by the pressure at the bus bars supplied by the transformer whose regulation is under consideration, and, secondarily, by the pressure of the current supplied to the field of the synchronous motor. This automatic mechanism will be understood to better advantage by reference to the drawings. I may state at this point, however, that the control of the field excitation of the synchronous motor effected in this way will cause the synchronous motor to pick up a more or less leading current, as may be required to maintain a power factor which will give the transformer the requisite regulation.

In the accompanying diagrammatic drawing I have illustrated the combination of my invention.

The 12,000 volt buses A, B and C are supplied from the generator G. The primary windings A', B' and C' of the three phase transformer are connected with the 12,000 volt buses, as shown. The secondary windings $A^2$, $B^2$ and $C^2$ of the three phase transformer are connected with the 4,000 volt feeder buses a, b and c. The junction point of the star winding of the secondary windings of the transformer is connected to ground g, as shown. The load circuits L' and $L^2$ are shown leading from the 4,000 volt buses a, b and c.

The transformer T is constructed in such a way that there will be a large leakage of magnetic lines of force between the primary and the secondary windings. To this end, the primary and secondary windings are not closely interlaced. On the contrary, the secondary windings are considerably displaced relative to the primary windings with the result that a considerable proportion of the lines of force which link the primary turns do not thread the secondary turns and vice versa. I have found in practice in installations of large power that excellent results are obtained when the impedance drop of the transformer is brought in this way to about five per cent. at full load. As previously explained, a transformer of such high impedance drop is well adapted to withstand the electrical shocks caused by short-circuit or other derangement. Its regulation is necessarily poor, however, particularly when the feeders L' and $L^2$ supply large induction motors which are started from time to time or when, for any reason, the power factor of the load is low. In accordance with my invention I improve the power factor to a point at which the regulation of the transformer having the large five per cent. impedance drop will be comparatively good. The armature of the three phase synchronous motor S is connected with the 4,000 volt buses a, b and c. The direct current field winding F of the synchronous motor is supplied with current delivered through the exciter buses d and f. The exciter is shown at E. It is a compound wound dynamo of direct current, the armature being indicated at r, the series field winding at h and the shunt field at $j$. It will be noted that the variable resistance R is included in series with the shunt field winding $j$ of the exciter. The manually operable regulating switch $w$ can be set to determine the amount of the resistance in series with the shunt winding of the exciter. With constant excitation of the field of the synchronous motor the regulation of the transformer and line will be much improved due to the better power factor of the load on the transformer and the smaller line current. With such constant excitation of the synchronous motor the fluctuations in the load must be taken up wholly by the transformer. In order to still further improve the regulation and also to take up fluctuations coming from the generating station as well as the fluctuations due to changes in the load on the line, I provide switch mechanism for intermittently short-circuiting the resistance R, which normally is included in circuit with the shunt winding $j$ of the exciter E. When the resistance R is short-circuited the field magnet of the exciter will be strengthened, thereby raising the voltage of the current supplied to the exciter buses. The fields of the synchronous motor S will therefore be strengthened and the synchronous motor will be made to pick up more of a leading current. When the short-circuit is taken off the resistance R the reverse effect will ensue.

In accordance with my invention, the short-circuiting of the resistance in series with the shunt winding of the exciter is controlled by a combination of electromagnetic mechanism acting upon the pairs of switch contacts 1, 2, 3, 4 and 5. The effect of the closure of these contacts is to short-circuit the resistance R. When the contacts are opened the resistance R is included in circuit. These switch contacts are normally in more or less rapid vibration and in order that the pressure across any pair of contacts shall not be so great as to cause destructive arcing the resistance R is divided up into a number of sections, each section being connected with one pair of the contacts. All of the contacts are, however, opened or closed simultaneously. The insulated rod 6 communicates the motion of the bell crank armature 7 to the pairs of switch contacts 1, 2, 3, 4 and 5. The armature 7 is controlled by a differentially wound relay magnet 8. One winding 9 of this magnet is connected with the exciter buses $d$ and $f$ by means of the wires 10 and 11. The circuit of the other winding 12 of this differential relay leads through the wire 13 to the lower contact 14 of a pair of floating contacts, the upper contact 15 of the pair being connected through the wire 16 with the negative exciter bus bar. The floating contacts are under the control of electromagnets, one of which is energized by an alternating current proportional to the pressure on the 4,000 volt buses and the other of which is energized by a current proportional to the pressure of the current which excites the field of the synchronous motor. The alternating current magnet is indicated at 17. It is energized by a current delivered from the potential transformer 18, the primary winding of this transformer being connected, as shown, between one of the 4,000 volt bus bars and ground. The energization of the electromagnet 17 raises the weight of the core 19 to depress the contact 14 of the floating pair. An adjustable counterweight 20 more or less completely balances the weight of the core 19. A dashpot 21 steadies the movement of this contact and its electromagnetic controlling mechanism. The upper contact 15 of the floating pair is controlled by the winding 22 of the direct current electromagnet, this winding being connected, as shown, across the exciter bus bars. The energization of this helix draws the core 23 downwardly, thereby tending to separate the contacts 15 and 14. An adjustable spring 24 opposes the movement of the core 23 when energized. A stop 25 limits the movement of the core 23 when the energization of the coil 22 is increased. The electrical and magnetic adjustments are made such that when the exciter field resistance R is included in circuit the pressure of the exciter buses will be too low and such that when the resistance R is short-circuited the pressure on the exciter bus bars will increase to a point which is too high. If we assume now that the pressure of the alternating current on the 4,000 volt bus bars decreases, the potential transformer 18 will deliver a current of decreased strength to the alternating current control magnet 17. This magnet will therefore permit the core 17 to drop, thereby closing the floating contacts 14 and 15. The closure of the circuit through these contacts will cause the energization of the winding 12 of the differential relay 8. The effect of the current flowing through this winding 12 will be to neutralize the magnetism due to the current flowing steadily through the winding 9, with the result that the armature 7 will be retracted by its spring to cause the closure of the several pairs of short-circuiting contacts 1, 2, 3, 4 and 5. When the resistance R is cut out of the circuit of the field winding $j$ of the exciter, due to the closure of these short-circuiting contacts, the field strength of the exciter will be increased with the result that the exciter will increase the pressure of the current delivered to the field magnet F by the synchronous motor S. The increase in the voltage of the exciting current will have an immediate effect in increasing the energization of the direct current control magnet 22, which will act to draw in its core 23, thus causing the floating contact 15 to separate from lower contact 14. The downward movement of the core 23 of the direct current control magnet may be limited by the stop 25, thus causing the separation of the floating contacts to be effected as follows: The increase in the pressure of the exciter current will cause an increased excitation of the field magnets of the synchronous motor S. This will cause the synchronous motor to pick up a more leading current. This will improve the power factor of the load on the alternating current transformer. Its regulation will therefore be improved and the alternating current pressure on the 4,000 volt buses will be increased. An increase in the pressure of the alternating current will cause an increased energization of the alternating current control magnet 17. The increased energization of this magnet will raise the core 19, tending to open the contacts 14 and 15. It will be apparent that any drop in the pressure across the exciter buses will decrease the energization of the direct current control magnet 22, thereby tending to bring the floating contact 15 into engagement with the contact 14. Any drop in the alternating current pressure will tend to bring the contact 14 into engagement with the contact 15. When, however, the pressure has been increased to the proper point, the floating contacts will be separated, thereby cutting off the current supplied to the neutralizing winding of the differential relay. The resulting attraction of the armature 7 will cause the short-circuit around the resistance R to be removed. The resistance R having thus been included in circuit with the shunt winding of the exciter, the voltage of the current delivered by the exciter begins to drop, the field excitation of the synchronous motor drops correspondingly, the lag of the alternating current load upon the transformer increases and the pressure upon the 4,000 volt bus bar is correspondingly decreased. The various spring tensions and the counterweight upon the lower contact of the floating pair are adjusted to maintain the desired voltage. The cycles of events controlled by the floating contacts are carried out with extreme rapidity, giving rise to a vibration of the floating contacts rather than to the slow and gradual movement which might be inferred from the above description.

A series of condensers 26, 27, 28, 29 and 30 serves to reduce the sparking between the pairs of short-circuiting contacts. The condensers serve also to some extent to smooth out the irregularities in the field magnet current of the exciter. The magnetic inertia of the field magnets is such that the previously described changes in magnetism do not take place as suddenly as might be expected. The result is that the operation of the extremely sensitive control magnets maintains a steady pressure on the exciter bus bars. This pressure, while steady, is not uniform. It varies gradually to maintain such a degree of excitation in the field of the synchronous motor that the power factor of the transformer load will be varied to coöperate with the transformer itself in producing a substantially constant pressure upon the 4,000 bolt bus bars.

It will be apparent that variations in pressure coming from the generator station will affect the automatic regulating mechanism in a manner corresponding with that already described and to a considerable extent. Therefore the combination of my invention will serve to maintain the proper pressure upon mains and feeders, regardless of whether the fluctuations come from the generating station or from variations or changes in the character of the load upon the lines supplied by the transformer.

Various accessories, such as the rheostat $r$ in circuit with the field winding of the synchronous motor, will of course be applied in accordance with the well known practice of the art.

Having described my invention, I claim as new and desire to secure by Letters Patent:

1. In combination, alternating-current supply mains having a substantially constant electro-motive force impressed thereupon, load circuit mains, a transformer comprising primary and secondary windings connected to said supply and said load mains, respectively, said transformer being so constructed as to secure sufficiently high magnetic leakage to limit the current on accidental short circuit to a safe value and thereby prevent disruption of the transformer, a rotary condenser, such as a synchronous motor connected across said load circuit mains, means for over-exciting the field of said synchronous motor to cause the same to draw leading current sufficient to correct the leakage of the transformer at a given load, and a regulating device controlled by the voltage on said load mains for regulating the field strength of said rotary condenser to a proper degree.

2. In combination, three-phase supply mains having a substantially constant alternating electro-motive force impressed thereupon, three-phase load mains, transformer means including primary windings connected to the supply mains, and secondary windings connected to the load mains, cores for said windings, said windings being spaced apart on said cores to cause relatively high magnetic leakage between said windings, and thereby to limit short circuit current to a safe value, load devices connected to said load mains, a three-phase rotary condenser having means to over-excite the field thereof connected to said load mains, and a voltage-controlled regulator for governing the field excitation of said rotary condenser to correct the magnetic leakage in the transformer regardless of the value of the load.

In witness whereof, I hereunto subscribe my name this 1st day of December, A. D., 1910.

EDMUND O. SCHWEITZER.

Witnesses:
E. T. GALLS,
W. A. BLIND.